M. METZGER.
DISPLAY HOLDER FOR TIRES.
APPLICATION FILED APR. 13, 1918.
1,354,774.
Patented Oct. 5, 1920.
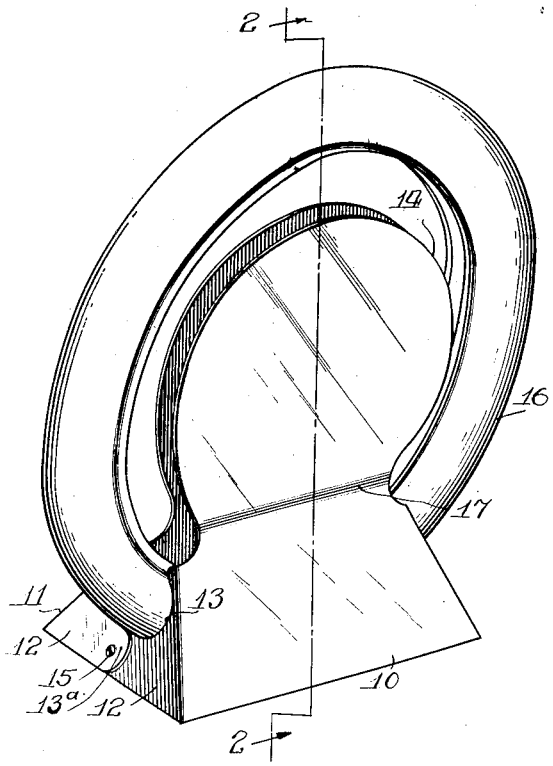
Fig. 1
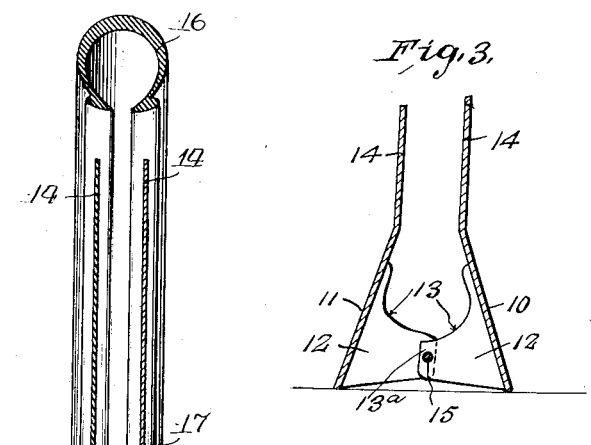
Fig. 2
Fig. 3.
Inventor
Myer Metzger.
By:

UNITED STATES PATENT OFFICE.

MYER METZGER, OF CHICAGO, ILLINOIS.

DISPLAY-HOLDER FOR TIRES.

1,354,774.  Specification of Letters Patent.  Patented Oct. 5, 1920.

Application filed April 13, 1918. Serial No. 228,314.

*To all whom it may concern:*

Be it known that I, MYER METZGER, a citizen of the United States, residing at Chicago, in the county of Cook and State of Illinois, have invented certain new and useful Improvements in Display-Holders for Tires, of which the following is a specification.

This invention relates to improvements in display holders for tires and one of the objects of the invention is to provide an improved holder of this character for holding and displaying tires and which holder is adapted to operate by the weight of the tire therein to grip and hold the tire.

A further object is to provide an improved holder of this character embodying coöperating and supporting clamping members between which one portion of the tire tube is adapted to be placed to be supported by the holder and which holder is adapted to accommodate itself to the varying diameters of the tubes of different tires.

A further object is to provide an improved holder of this character having an extended portion for containing advertising matter and which portion is adapted to not only extend into the space within the tire but is also adapted to be bent or deflected and maintained in a substantially upright position regardless of the position of the body portion of the holder so that the advertising matter thereon will be presented in a proper position to be read, and at the same time the said extended portion will not interfere with the insertion of the tire into or the removal of the tire from the holder.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating the invention and in which—

Figure 1 is a perspective view of an improved apparatus of this character constructed in accordance with the principles of this invention and showing a tire in position in the holder.

Fig. 2 is a vertical sectional view taken on line 2—2, Fig. 1.

Fig. 3 is a detail sectional view showing the clamping jaws.

Referring more particularly to the drawing, the support proper comprises two complementary members 10, 11 constructed of sheet material, preferably of metal independent of and detached from each other. Each of the members 10 may be of any desired size and configuration but preferably of a substantially rectangular configuration, having its extremities 12 deflected laterally and the edge of each of the deflected portions 12 is cut away as at 13 to form a seat for the tire, having a projecting ear 13$^a$ there below.

Secured to each of the members 10 and 11, or constructed integrally therewith, is an extended portion 14 which may be of any desired size and configuration and is adapted to contain suitable advertising or reading matter.

The two members 10 and 11 thus formed, are pivotally and detachably connected together in any desired or suitable manner such as by means of a fastening device 15, and the parts when assembled are so arranged that the bottom edges of the members 10, 11, as well as the lower edges of the deflected ends 12, will rest flat upon the supporting surface and the portions 13 of the two members will coöperate to form a tire seat.

In use, the members 10 and 11 are separated slightly by moving them about their pivots and the tire 16 is then placed within the seats 13. The weight of the tire resting upon the seats will cause the members 10 and 11 to be moved toward each other so that the tire will be gripped by the edges of the seat 13. The extended portions 14 project into the space within the tire so that advertising or reading matter, which is placed upon these portions 14 and which portions may be of any desired size, will be in a position to be read or displayed.

In order to properly position the portions 14, with respect to the body of the holder, these portions 14 are adapted to be deflected along the line 17 so that the portions 14 will stand substantially upright.

What is claimed as new is:

A tire display holder embodying a body comprising coöperating rigid base members constructed of sheet material, said members being separate from each other and each comprising a body having laterally deflected ends, the respective deflected ends extending toward each other with their extremities overlapping, fastening devices engaging the ends of adjacent deflected portions for pivotally and detachably connecting the said members, the upper edges of the ends adjacent their pivots being shaped to form tire seats whereby the edges of the said deflected portions will operate to grip the tire, the body portion of one of the said members intermediate the said deflected ends extending for a considerable distance above the upper edges of the said ends to project into or over the space within the tire in the holder, the said extended portion being adapted to be flexed with respect to the remaining portion of the body of said member whereby said extended portion may be caused to assume and maintain an upright position with respect to the body of the member in any position which the said member may assume.

In testimony whereof I have signed my name to this specification, this 5th day of April, A. D. 1918.

MYER METZGER.